(12) United States Patent
Krishnamurthy et al.

(10) Patent No.: US 8,442,513 B2
(45) Date of Patent: May 14, 2013

(54) MEASUREMENT REPORT RELIABILITY IN WIRELESS COMMUNICATION SYSTEMS

(75) Inventors: Sandeep H Krishnamurthy, Arlington Heights, IL (US); Ravi Kuchibhotla, Gurnee, IL (US); Murali Narasimha, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 738 days.

(21) Appl. No.: 12/605,448

(22) Filed: Oct. 26, 2009

(65) Prior Publication Data

US 2010/0112958 A1    May 6, 2010

Related U.S. Application Data

(60) Provisional application No. 61/111,267, filed on Nov. 4, 2008.

(51) Int. Cl.
*H04W 24/00* (2009.01)
(52) U.S. Cl.
USPC ........................................ 455/423; 455/422.1
(58) Field of Classification Search ............... 455/67.11, 455/436, 437, 438, 439, 441, 443, 442, 444, 455/423, 424–425, 422.1, 421, 67.14, 115.1, 455/226.1
See application file for complete search history.

(56) References Cited

U.S. PATENT DOCUMENTS

| 7,003,290 B1 | 2/2006 | Salonaho et al. |
| 2008/0225801 A1* | 9/2008 | Turk ............................. 370/332 |
| 2010/0298001 A1* | 11/2010 | Dimou et al. ................. 455/441 |

OTHER PUBLICATIONS

3GPP TS 36.331 v8.3.0 (Sep. 2008) Section 5.5.2.8; 3rd Generation Partnership Project; Technical Specification Group Radio Access Network; Evolved Universal Terrestrial Radio Access (E-UTRA); Radio Resource Control (RRC); Protocol Specification (Release 8). 3GPP TSG-RAN WG4 Meeting #49bis; Prague, CZ, Nov. 10-14, 2008; L3 Filtering in Emergency Handover Situations; R4-083024. IEEE; Performance Analysis of Handover Measurements and Layer 3 Filtering for UTRAN LTE; Anas et al.,; PIMRC '07; 5 pages.

* cited by examiner

*Primary Examiner* — Nay A Maung
*Assistant Examiner* — Angelica M Perez

(57) ABSTRACT

A method in a mobile station for measurement reporting in a wireless system includes detecting the presence of a cell, applying a first filter to a first number of measurement samples of a first measurement quantity of the cell wherein the first number of measurement samples are determined from a switch point, and applying a second filter to a plurality of measurement samples obtained from measurements made subsequent to the first number of measurement samples.

14 Claims, 2 Drawing Sheets

MEASUREMENT REPORT RELIABILITY IN WIRELESS COMMUNICATION SYSTEMS

CROSS REFERENCE TO RELATED APPLICATIONS

The present application is related to co-pending U.S. Application No. 61/111,267 filed on 4 Nov. 2008, the contents of which are hereby incorporated by reference and from which benefits are claimed under 35 U.S.C. 119.

FIELD OF THE DISCLOSURE

The present disclosure relates generally to wireless communications and more particularly to measurement reporting in wireless communication networks, corresponding entities and methods.

BACKGROUND

The mobility of mobile stations (MS) between different cells in a cellular communication network in connected mode is primarily based on measurement reports sent by the MS to the serving cell. The network can configure an MS to send a measurement report (MR) on the uplink if a certain condition, also referred to as the triggering criterion, is satisfied.

An MS implementing 3GPP LTE technology can be configured to trigger a MR based on measurement of reference signal receive power (RSRP) or reference signal receive quality (RSRQ). An MS may also be referred to as a UE. Based on the MR sent by the MS, the network can detect an event when the MS must be handed-over from one cell to another. Typical scenarios under which a handover occurs include the coverage-limited case when, for example, the MS is at the cell-edge. Another scenario under which handover occurs is in load balancing cases when the serving cell is heavily loaded.

Another instance under which handover occurs is when the MS suddenly encounters a coverage hole. For example, when the MS turns around the corner of a building in an urban micro-cell deployment, suddenly the serving cell power may drop steeply and a neighbor cell which was hitherto invisible becomes detectable. Irrespective of which mode the LTE UE is operating in (non-DRX or DRX) the base-station does not know the exact instant a neighbor cell becomes detectable. This neighbor cell could either be on the same carrier (intra-frequency) or on a different carrier (inter-frequency).

The network typically has the option of controlling the Layer 3 (L3) filter by configuring suitable time to trigger (TTT) and L3 coefficient (k). But these offer limited help in emergency handovers situations. In emergency handovers, the network might be required to handover the UE after one measurement report and in this scenario, the accuracy of L3 filtered RSRP/RSRQ measurements (sent after ascertaining that the triggering criterion holds for TTT amount of time) affects the handover performance. One can envision the following scenarios. Because of the inaccuracy in the L3 filtered measurement, the MS can fail to trigger a measurement report resulting in a dropped connection. Such a scenario may be characterized as missed-reporting. In another scenario, one neighbor cell can get falsely or incorrectly ranked higher than another neighbor cell (stronger than the first neighbor cell) leading to either handover failure or handover inefficiency. Such a scenario may be characterized as false-reporting.

L3 filtering for RSRP/RSRQ measurements in E-UTRA is currently defined by the following text in TS 36.331 version 8.3.0, section 5.5.2.8 as follows. If the IE QuantityConfig is received the UE shall, depending on the measurement quantity, apply filtering of the measurements for that measurement quantity according to the formula below. This filtering shall be performed by the UE before UE event evaluation. The UE shall depending on the reporting quantity also filter the measurements reported in the IE MeasuredResults. The filtering shall be performed according to the following formula: $F_n = (1-a) \cdot F_{n-1} + a \cdot M_n$. The variables in the formula are defined as follows: $F_n$ is the updated filtered measurement result; $F_{n-1}$ is the old filtered measurement result; $M_n$ is the latest received measurement result from physical layer measurements, the unit used for $M_n$ is the same unit as the reported unit in the MeasurementReport message or the unit used in the event evaluation; $a=1/2^{(k/4)}$, where k is the parameter received in the filterCoefficent field of the IE QuantityConfig. NOTE: if k is set to 0 that will mean no layer 3 filtering. In order to initialize the averaging filter, $F_0$ is set to $M_1$ when the first measurement result from the physical layer measurement is received. The physical layer measurement results are sampled once every measurement period. Both the measurement period and the accuracy for a certain measurement are defined in 3GPP TS 36.133, Requirements in support of Radio Resource Management. Layer 3 filtering is applicable to all UE measurement quantities listed in 3GPP TS 36.331, Radio Resource Control. The layer 3 filtering shall be performed in the same domain as the measurement or reporting is done, i.e., logarithmic filtering for logarithmic measurements, etc. There shall only be one layer 3 filter per measurement quantity.

In addition to the filter coefficient a, there is a time to trigger (TTT) quantity that is signaled in the RRC QuantityConfig and ReportConfig messages, respectively. The above L3 filter is an infinite impulse response (IIR) filter in the log-domain, denoted as "log-IIR filter" in what follows. For a typical TTT configuration (~100 ms), even in non-DRX mode, one measurement report sent by the MS is based on 2 or 3 Layer 1 (L1) measurements. We further note the following points. The TTT criterion checks that the L3 evaluation is persistent over a window of time. Even in the non-DRX case, the number of successive L3 evaluations that the TTT checks for is quite small (=3-5, for TTT=100-200 ms). In the DRX case, this number could be smaller (<=2 for DRX>=160 ms). It is easy to show that log-IIR filter results in a biased estimate of the RSRP/RSRQ levels (for example, even in static channels). When there is insufficient L3 averaging, the bias and the variance in the L3 filtered quantity can lead to large variations of the estimate around the nominal. The currently defined L3 filter does not provide any noise averaging when dealing with so few samples. Further, it can lead to noise enhancement in time-correlated interference.

When, for example, the user turns a corner resulting in a change in signal levels, the base station does not know the exact instant the UE is able to detect a neighbor cell. This applies to both intra-frequency and inter-frequency cell identification in both non-DRX and DRX modes. The base station therefore does not have a mechanism to send a RRC measurement reconfiguration message to change the L3 coefficient/ TTT based on the situation. For example, it cannot dynamically program a larger TTT for the case when a cell is newly detected at the "right" instant.

The various aspects, features and advantages of the disclosure will become more fully apparent to those with ordinary skill in the art on consideration of the following Detailed Description and the accompanying drawings. The drawings have been simplified for clarity and are not necessarily drawn to scale.

DETAILED DESCRIPTION

Figure 1:
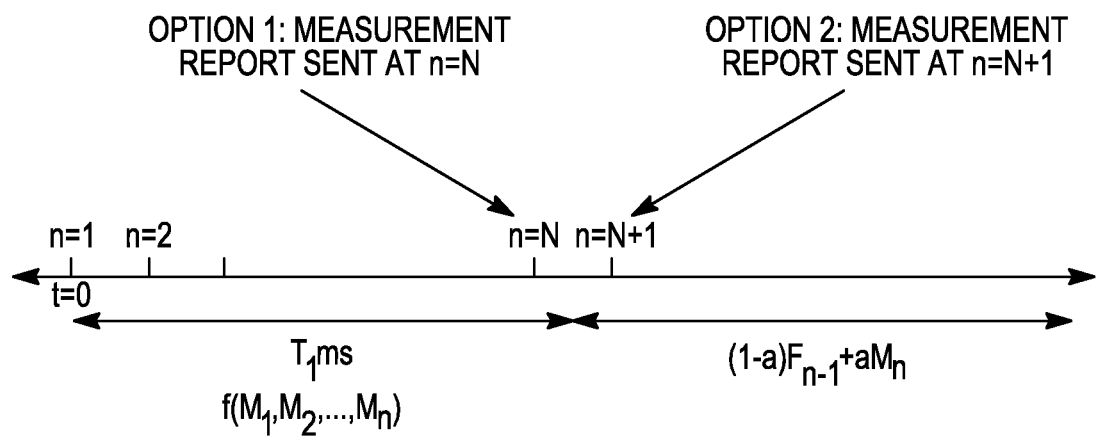
FIG. 1 schematic diagram of the hybrid Layer 3 filter implementation.

According to the present disclosure, a filter that linearly averages the L1 measurements would provide better noise averaging and is more likely optimal in mitigating time-uncorrelated interference. A filter implementation is proposed where a first filter (or filter 1) is used either until a certain number of samples are received or until a certain amount of time elapses, and a second filter (or filter 2) is used for the subsequent time epoch.

Mathematically, the filter is defined as follows $$F_n = \begin{cases} f_1(M_1, M_2, \ldots, M_n), & n \leq N \\ f_2(M_1, M_2, \ldots, M_n), & n > N, \end{cases} \quad (1)$$

where $f_1(M_1, M_2, \ldots, M_n)$ and $f_2(M_1, M_2, \ldots, M_n)$ are two functions that map the first n L1 measurements to real number.

For LTE implementations, the MS can revert back to using the log-IIR mechanism for filter 2 by defining $$f_2(M_1, M_2, \ldots, M_n) = (1-a)F_{n-1} + aM_n. \quad (2)$$

Together with this, we list three different realizations that could be used for $f_1(M_1, M_2, \ldots, M_n)$ in what follows.

In a first realization, assume that $M_k = 10 \log_{10}(\xi_k/\eta_k)$, where $\xi_k$ and $\eta_k$ are quantities measured by L1 that are to be used in generating RSRP or RSRQ measurements for L3 filtering.

For RSRP measurement, $\eta_k = 1$ and $\xi_k$ is the L1 estimate of RSRP within one measurement duration. For RSRQ measurement, $\xi_k$ and $\eta_k$ are respectively the L1 estimates of RSRP and RSSI within one measurement duration. Then define $$f_1(M_1, M_2, \ldots, M_n) = 10\log_{10}\left(\frac{(1/n)\sum_{k=1}^{n}\xi_k}{(1/n)\sum_{k=1}^{n}\eta_k}\right) \quad (3)$$

$$= 10\log_{10}\left(\frac{\sum_{k=1}^{n}\xi_k}{\sum_{k=1}^{n}\eta_k}\right).$$

In other words, both the numerator and denominator are averaged before taking the ratio and the logarithm. For the case of RSRP, this reduces to $$f(M_1, M_2, \ldots, M_n) = 10\log_{10}\left((1/n)\sum_{k=1}^{n}\xi_k\right). \quad (4)$$

In a second realization, using the same notation above, define $$f_1(M_1, M_2, \ldots, M_n) = 10\log_{10}\left((1/n)\sum_{k=1}^{n}(\xi_k/\eta_k)\right). \quad (5)$$

For the case of RSRP, this reduces to $$f_1(M_1, M_2, \ldots, M_n) = 10\log_{10}\left((1/n)\sum_{k=1}^{n}\xi_k\right), \quad (6)$$

which is the same as the first realization.

In a third realization, using the same notation above, define $$f(M_1, M_2, \ldots, M_n) = (1/n)\sum_{k=1}^{n}M_n. \quad (7)$$

In addition, the reporting criterion can be modified as follows: For the duration of time $t \leq T_1$, a measurement report is sent only if the triggering condition is satisfied at n=N. The integer N is derived such that $n \leq N$ correspond to instants at which L1 updates measurements to L3 up until $T_1$ amount of time after the first measurement report for a new cell is received by Layer 3. For $t > T_1$, a measurement report is sent if the triggering condition is satisfied only if the triggering condition holds for the TTT amount of time. In 3GPP UMTS and 3GPP LTE Release 8 specifications, the mobile station uses the log-IIR mechanism defined in the following for all t.

$$f_2(M_1, M_2, \ldots, M_n) = (1-a)F_{n-1} + aM_n \quad (8)$$

The quantity $T_1$ is signaled by the network. One option is to choose $T_1$ to be identically same as TTT.

A schematic diagram of the hybrid filter implementation is illustrated in FIG. 1. With this, there are two options for reporting the measurement if the triggering condition holds at n=N. A first option is to send the measurement report is at n=N. A second options is to send the measurement report is at n=N+1. The first option might be preferred in the non-DRX mode of operation. The second option might be preferred in the DRX mode of operation.

It should be noted that the L3 filtering mechanism selects between two approaches, i.e., R1, R2 or R3, and the log-IIR filter depending on the instant of L3 evaluation.

If there are insufficient samples (i.e., $n \leq N$) for the application for the log-IIR filter, averaging based on R1, R2 or R3 is applied. This method of selecting between different filtering approaches based on the amount of accumulated history is termed as the "hybrid approach".

The quantity N where the switchover should occur is determined by one of the following approaches. It is configured by means of network signaling (via RRC, SI-x, etc.).

It is computed by the MS by making use of a signaled quantity. A quantity specifying the physical duration of time, $T_1$ ms, at which this switchover should occur can be signaled. For example, if the L1 update rate is once every $X_1$ ms, then the UE can determine the switchover point using either of the two equations N=ceil $(T_1/X_1)$ or N=floor $(T_1/X_1)$.

It can be shown, under mild assumptions on the RSRP/RSSI estimates obtained at the L1 level, that linear averaging as listed in R1 is optimal for noise averaging. In other words, R1 provides for the best accuracy and results in lower false/failed triggering probabilities than are achievable by the log-IIR filter alone.

Figure 2:
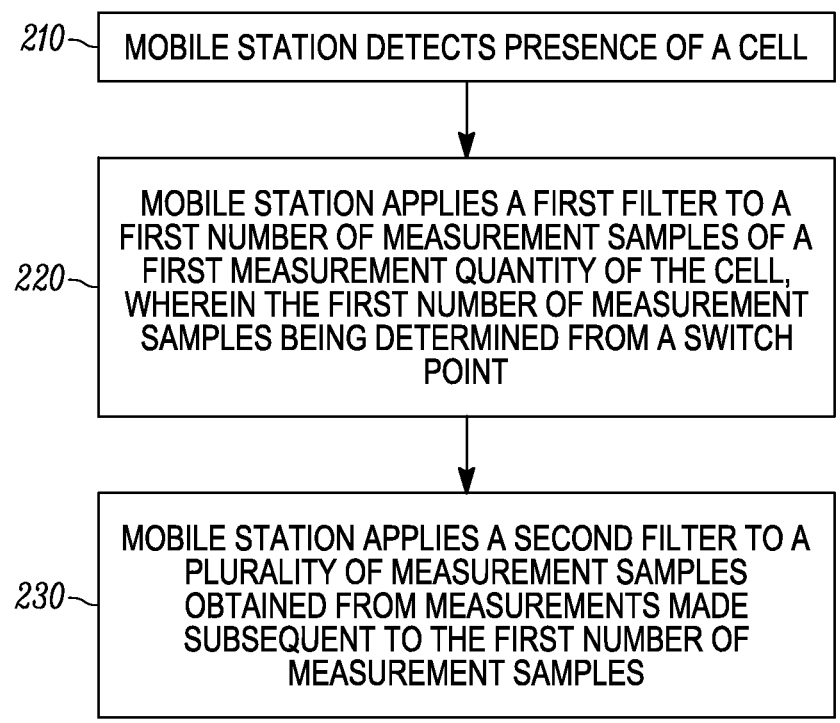
FIG. 2 is a process flow diagram.

FIG. 2 is a process 200 implemented in a mobile station for measurement reporting in a wireless communication system. At 210, the mobile station detects presence of a cell. At 220, the mobile station applies a first filter to a first number of measurement samples of a first measurement quantity of the cell, the first number of measurement samples being determined from a switch point. In one embodiment, the switch point is a number of measurement samples and the value of the first number of measurement samples is equal to the switch point. In another embodiment, the switch point is a duration of time and the first number of measurement samples include only measurement samples corresponding to measurements made in a time interval of length equal to the duration of time starting at the time of detection of the cell. In one embodiment, the first measurement quantity of the cell is Reference Symbol Received Power (RSRP). In another embodiment, the first measurement quantity of the cell is Reference Symbol Received Quality (RSRQ).

In one implementation, determining the first number of measurement samples from the switch point includes computing an arithmetic average of the first number of measurement samples. The arithmetic average of the first number of measurement samples may be computed in a linear domain. The arithmetic average of the first number of measurement samples may also be computed in a logarithmic domain.

In another implementation, determining the first number of measurement samples from the switch point includes applying the first filter to a subset of the first number of measurement samples. In another implementation, determining the first number of measurement samples from the switch point includes applying the first filter to a subset of the first number of measurement samples.

In one embodiment, the first number of measurement samples of the first measurement quantity is determined as a ratio of corresponding measurement samples of each of a second measurement quantity and a third measurement quantity, and determining the first number of measurement samples from the switch point includes computing a ratio of the arithmetic average of the first number of samples of the second measurement quantity to an arithmetic average of a first number of samples of the third measurement quantity. In another embodiment, the first number of measurement samples of the first measurement quantity is determined as a ratio of corresponding measurement samples of each of a second measurement quantity and a third measurement quantity, and a first filter is applied to a first number of measurement samples of a first measurement quantity of the cell, the first number of measurement samples being determined from the switch point includes computing an arithmetic average of ratios of corresponding samples of each of the first number of samples of the second measurement quantity and the third measurement quantity.

In FIG. 2, at 230, the mobile station applies a second filter to a plurality of measurement samples obtained from measurements made subsequent to the first number of measurement samples. In one embodiment, the mobile station receives a measurement configuration including a switch point including receiving a plurality of reporting criteria. The mobile station calculates a result of applying a first filter to a first number of measurement samples of a first measurement quantity of the cell, compares the result to at least one of the plurality of reporting criteria and determines that at least one of a plurality of reporting criteria are satisfied, and transmits a measurement report. In another embodiment, the second filter is an infinite impulse response (IIR) filter. In another embodiment, the mobile station determines that a triggering condition has been met, determines that the instant defined by the switch point has occurred, and sends a measurement report. In another embodiment, the mobile terminal determines that the instant defined by the switch point has not occurred, determines that there are no measurement opportunities prior to the switch point instant, and sends a measurement report.

While the present disclosure and the best modes thereof have been described in a manner establishing possession by the inventors and enabling those of ordinary skill to make and use the same, it will be understood and appreciated that there are equivalents to the exemplary embodiments disclosed herein and that modifications and variations may be made thereto without departing from the scope and spirit of the invention, which are to be limited not by the exemplary embodiments but by the appended claims.

What is claimed is:

1. A method in a mobile station for measurement reporting in a wireless system, the method comprising:
  detecting presence of a cell;
  applying a first filter to a first number of measurement samples of a first measurement quantity of the cell, the first number of measurement samples being determined from a switch point; and
  applying a second filter to a plurality of measurement samples obtained from measurements made subsequent to the first number of measurement samples;
  wherein the first number of measurement samples of the first measurement quantity is determined as a ratio of corresponding measurement samples of each of a second measurement quantity and a third measurement quantity; and
  wherein determining the first number of measurement samples from the switch point includes computing a ratio of the arithmetic average of the first number of samples of the second measurement quantity to an arithmetic average of a first number of samples of the third measurement quantity.

2. The method according to claim 1, wherein determining the first number of measurement samples from the switch point includes computing an arithmetic average of the first number of measurement samples.

3. The method according to claim 2, wherein computing the arithmetic average of the first number of measurement samples includes computing the arithmetic average of the first number of measurement samples in a linear domain.

4. The method according to claim 2, wherein computing the arithmetic average of the first number of measurement samples includes computing the arithmetic average of the first number of measurement samples in a logarithmic domain.

5. The method according to claim 1, wherein the second filter is an infinite impulse response filter.

6. The method according to claim 1, wherein determining the first number of measurement samples from the switch point includes applying the first filter to a subset of the first number of measurement samples.

7. The method according to claim 1, wherein
  the first number of measurement samples of the first measurement quantity is determined as a ratio of corresponding measurement samples of each of a second measurement quantity and a third measurement quantity, and
  applying a first filter to a first number of measurement samples of a first measurement quantity of the cell, the first number of measurement samples being determined from the switch point includes computing an arithmetic average of ratios of corresponding samples of each of the first number of samples of the second measurement quantity and the third measurement quantity.

8. The method according to claim 1, wherein the switch point is a number of measurement samples, and the value of the first number of measurement samples is equal to the switch point.

9. The method according to claim 1, wherein the switch point is a duration of time, and the first number of measurement samples include only measurement samples corresponding to measurements made in the duration of time.

10. The method according to claim 1, wherein the first measurement quantity of the cell is Reference Symbol Received Power (RSRP).

11. The method according to claim 1, wherein the first measurement quantity of the cell is Reference Symbol Received Quality (RSRQ).

12. The method according to claim 1, wherein
receiving a measurement configuration including a switch point further includes receiving a plurality of reporting criteria,
calculating a result of applying a first filter to a first number of measurement samples of a first measurement quantity of the cell,
comparing the result to at least one of the plurality of reporting criteria and determining that at least one of a plurality of reporting criteria are satisfied, and
transmitting a measurement report.

13. The method according to claim 1, further including
determining that a triggering condition has been met,
determining that the instant defined by the switch point has occurred, and
sending a measurement report.

14. The method according to claim 13, further including
determining that the instant defined by the switch point has not occurred,
determining that there are no measurement opportunities prior to the switch point instant, and
sending a measurement report.

* * * * *